UNITED STATES PATENT OFFICE.

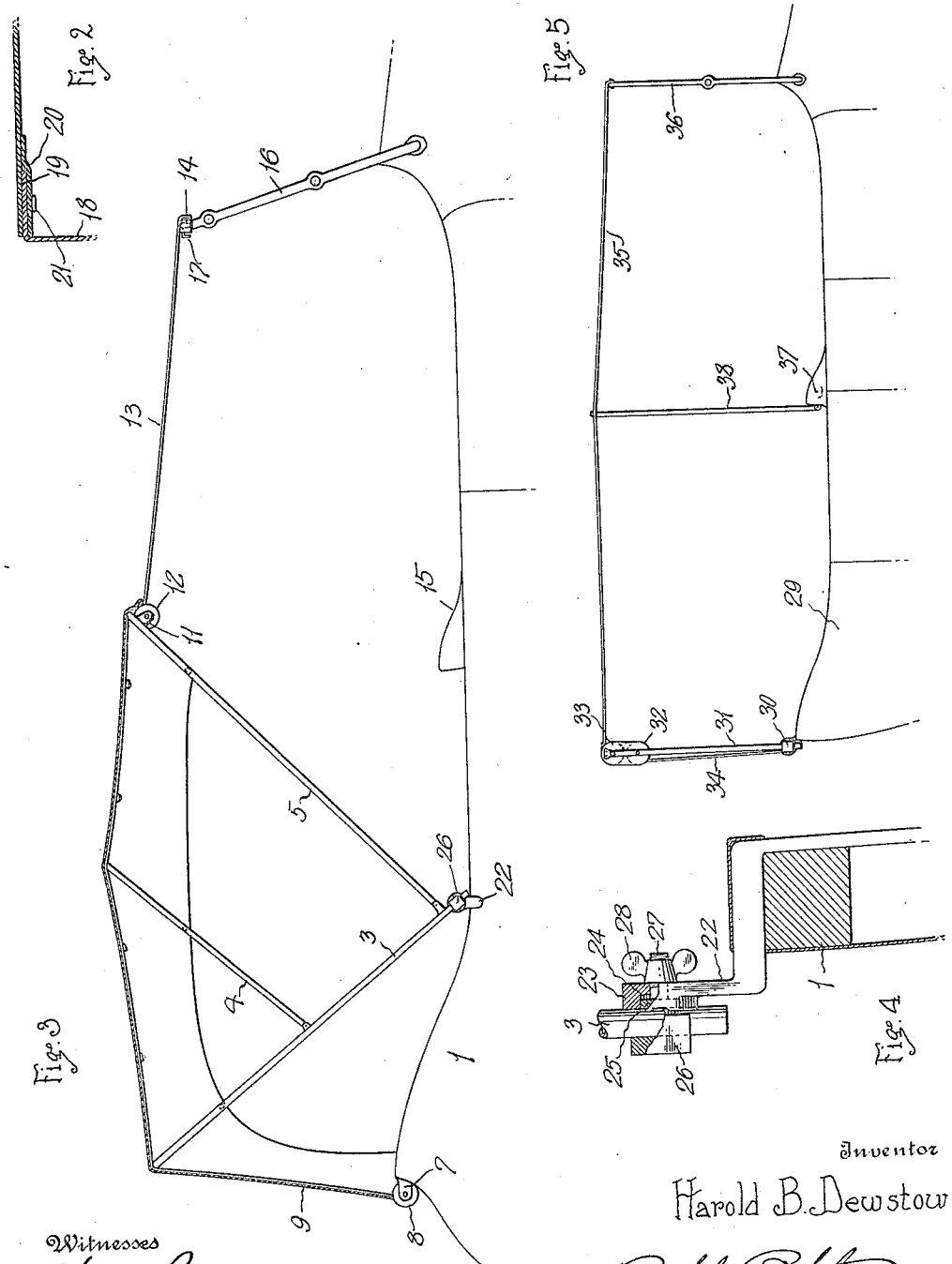

HAROLD B. DEWSTOW, OF DETROIT, MICHIGAN.

VEHICLE TOP.

1,403,299. Specification of Letters Patent. Patented Jan. 10, 1922.

Application filed November 8, 1917. Serial No. 201,051.

*To all whom it may concern:*

Be it known that I, HAROLD B. DEWSTOW, a citizen of the United States of America, residing at Detroit, in the county of Wayne and State of Michigan, have invented certain new and useful Improvements in Vehicle Tops, of which the following is a specification, reference being had therein to the accompanying drawings.

This invention relates to vehicle tops, and has special reference to a top or canopy somewhat along the lines of that disclosed in my prior Patent No. 1,199,766, granted Oct. 3, 1916. In this patent there is shown a vehicle canopy having special bows for supporting the same in conjunction with a windshield, and rollers are employed for holding the canopy when not in use.

The primary object of the present invention is to provide a canopy or top cover that may be attached to the present style of bows by furnishing an automobile body and the bow thereof with rollers on which the canopy or top cover may automatically roll or wind, and it is preferable to make the canopy or top cover in two parts for the convenience of the occupants of an automobile provided with a top in accordance with my invention. One part of the canopy or top cover may be automatically brought into position when the top front bow is raised and this part of the top is for the convenience of those occupying the rear seat of an automobile body. The other part of the canopy or top cover cannot be used without the first mentioned part and is for the convenience of the occupants of the front seat of an automobile.

Another object of my invention is to provide an extremely light, durable and inexpensive vehicle top that may be easily and quickly manipulated, either to set up the top as a sun shade or protection against the elements or to collapse the top, the latter operation being facilitated by the spring actuated rollers which place the canopy or top cover in as compact a parcel as possible so that the collapsed canopy or top cover will present a neat and attractive appearance in connection with the automobile.

My invention includes forms of the canopy or vehicle top that have been tried out to my own satisfaction, and these forms will be hereinafter described and then claimed.

Reference will now be had to the drawings, wherein there are illustrated the preferred embodiments of my invention, but it is to be understood that the structural elements are susceptible to such changes, in size, shape and manner of assemblage, as fall within the scope of the appended claims.

In the drawings,

Fig. 2 is a detailed sectional view of the canopy or top cover, showing the manner of attaching side curtains;

Fig. 3 is a longitudinal sectional view of the vehicle top;

Fig. 4 is an enlarged detail view of the side iron or piece of hardware for the top, and Fig. 5 is a side elevation of a modified form of top.

Figure 1:
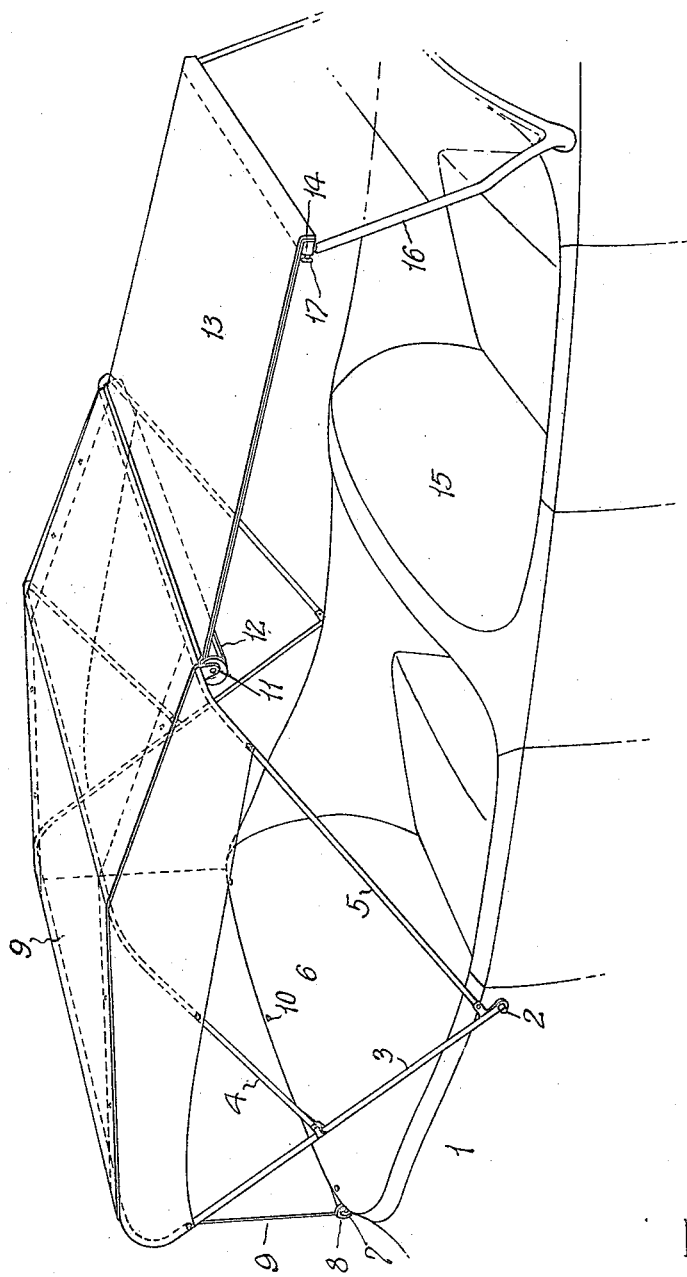
Figure 1 is a perspective view of a vehicle top in accordance with my invention.

In the drawings, the reference numeral 1 denotes a portion of a vehicle body and connected thereto by the usual side irons 2 is a rearwardly inclined bow 3 supporting an intermediate bow 4, and a forwardly inclined main bow 5, all of said bows being arranged and designed to extend above the rear portion of the automobile body 1 or collapsed on said body or bow rests carried thereby.

The automobile body 1 in the rear of the back seat 6 has a set of brackets 7 for a roller 8. This roller is constructed on the principle of the well known type of a spring curtain shade roller, that is, it has interiorly disposed springs adapted for re-winding the roller. Attached to the roller 8 and adapted to be wound thereon is a wide canopy or top cover 9 that extends upwardly over the bows 3, 4 and 5 and is suitably attached to the front bow 5, so that when said bow is raised or set up, the canopy or cover 9 will be stretched over the bows 3 and 4, as best shown in Figs. 1 and 3. When the bows are lowered or collapsed, the outer end of the canopy or cover 9 may be attached through the medium of snap buttons 10 or other fastening means, to the upper edge back of the rear seat 6 and to finish off the top of the rear seat and protect the wound canopy or cover that is on the roller 8, from the elements.

The top of the front main bow 5 has suitable brackets 11 for a roller 12, similar to the roller 8. Attached to and adapted to be wound on the roller 12 is the front part 13 of the canopy or top cover 9. The front part 13, constitutes a sun shade for the front seat 15 of the automobile, and at the outer end of the sun shade 13 is a transverse bar 14 adapted to be fixed relative to a windshield 16 by screws 17 or other fastening means. As an instance of other fastening means, I may employ the usual pin and socket connection for attaching the outrigger or horizontal bow of a top to the windshield. When the sun shade 13 is in a retracted position on the roller 12, the bar 14 is in parallelism with said roller and does not interfere with the collapsing of the main canopy or top cover 9.

Top side curtains 18 may also be used in connection with the main canopy or top cover 9, these side curtains being designated 18, with the upper edges 19 thereof extending into and connected to the side edges of the canopy or cover 9. The side edges of the canopy 9 may be provided with longitudinal pockets 20 to receive the edges 19 of the side curtains and suitable fastening means, as snap buttons 21 may be employed for connecting the curtains 18 to the canopy 9 and also to the bows 3, 4 and 5. It is optional with the users of the top as to whether the side curtains 18 are employed, but with said side curtains in position, the main canopy or top cover may be readily collapsed, the side curtains 18 folding inwardly in natural folds between the side arms of the bows 3, 4 and 5.

In lieu of the usual side irons 2, there may be special side irons 22, as shown in Figs. 3 and 4. Each side iron 22 has a grooved or castellated head 23 and a socket 24 to receive a bearing 25 of the holder 26. The holder 26 is adapted to receive the end of the rearwardly inclined bow 8 and said holder is cut away so that each end of the bow may engage in the grooves or castellations of the heads 23. To retain the holders 26 in engagement with the heads 23, the bearings 25 of the holders have screw-threaded studs 27 extending through the heads 23 and provided with winged thumb nuts 28 which may be tightened against the heads 23 to hold the ends of the bow 3 in engagement therewith.

Before considering the modification shown in Fig. 5, it is to be noted that straps may be substituted for the sun shade 13 and that suitable braces or carriage arms may be employed for holding the main front bow 5 in a set up position when the sun shade 13 is not in use.

As shown in Fig. 5, an automobile body 29 has the rear end thereof provided with side irons 30, similar to the side iron shown in Fig. 4. Adjustably held by the side irons 30 are uprights 31 and between the upper ends of the uprights are rollers 32 and 33. The roller 32 has a curtain or cover 34 adapted to be drawn down and attached to the rear end of the body 29 and the roller 33 has a canopy or top cover 35 adapted to be drawn forward and detachably connected to the upper end of a windshield 36. The front seat 37 of the automobile has a pivoted central bow 38 and the canopy top cover 35 may be connected to said bow when in a set up position.

The uprights 31 can be lowered to place the rollers 32 and 33 in proximity to the automobile body 29, and the bow 38 can be swung downwardly in the rear of the front seat 37 of the automobile body. The exact arrangement of the uprights 31 and the bow 38 depends on the style of automobile in connection with which the top is used but in either form of my invention, the uprights and bows are very light in construction and it is preferable to use material for the curtains, canopy and sun shade that can be readily laundered. The metallic fittings or hardware will conform in finish to that of the automobile, and since the top, in its entirety, consists of comparatively few parts, it is obvious that the top may be easily manipulated when setting up or collapsing the same.

What I claim is:—

The combination of an automobile body having a windshield and a top framework pivotally supported by said body to be folded thereon and provide forwardly and rearwardly extending bows, when set up, a roller on the forwardly extending bow of said top framework, a sun shade attached to and wound on said roller and adapted to be unwound therefrom and connected to said windshield, said sun shade when unwound being disposed at a rain shedding angle, a roller carried by said body, and a top cover attached to and wound on said roller and having an end attached to the forwardly extending bow of said top framework and adapted to be unwound by the raising of said bow and extend over the rearwardly extending bow, said top cover when unwound having its bow held and extending over the roller of said bow to serve as a shield therefor.

In testimony whereof I affix my signature in the presence of two witnesses.

HAROLD B. DEWSTOW.

Witnesses:
ANNA M. DORR,
KARL H. BUTLER.